United States Patent [19]
Niechcial

[11] Patent Number: 5,820,447
[45] Date of Patent: Oct. 13, 1998

[54] ICE BLASTING CLEANING SYSTEM

[75] Inventor: Roman Niechcial, Longview, Wash.

[73] Assignee: Inter+Ice, Inc., Kelso, Wash.

[21] Appl. No.: 801,190

[22] Filed: Feb. 18, 1997

[51] Int. Cl.$^6$ ........................................... B24C 7/00
[52] U.S. Cl. ................. 451/99; 62/346; 451/446
[58] Field of Search ................... 62/71, 74, 321, 62/346, 347, 545; 451/38, 39, 53, 60, 99, 102, 446, 2, 87, 447, 89, 100

[56] References Cited

U.S. PATENT DOCUMENTS

| | | |
|---|---|---|
| 402,968 | 5/1889 | Railsback . |
| 2,549,215 | 4/1951 | Mansted . |
| 2,699,403 | 1/1955 | Courts . |
| 2,749,722 | 6/1956 | Knowles . |
| 3,400,548 | 9/1968 | Drayer . |
| 3,494,144 | 2/1970 | Schill . |
| 4,038,786 | 8/1977 | Fong . |
| 4,125,969 | 11/1978 | Easton . |
| 4,389,820 | 6/1983 | Fong et al. . |
| 4,420,957 | 12/1983 | Weber . |
| 4,512,160 | 4/1985 | Mas ............................................. 62/71 |
| 4,617,064 | 10/1986 | Moore . |
| 4,655,847 | 4/1987 | Ichinoseki et al. . |
| 4,703,590 | 11/1987 | Westergaard . |
| 4,965,968 | 10/1990 | Kelsall . |
| 5,203,794 | 4/1993 | Stratford et al. . |
| 5,367,838 | 11/1994 | Visaisouk et al. . |
| 5,601,147 | 2/1997 | Lowe et al. . |
| 5,601,478 | 2/1997 | Mesher . |
| 5,623,831 | 4/1997 | Mesher . |

FOREIGN PATENT DOCUMENTS

| | | |
|---|---|---|
| 1321478 | 8/1993 | Canada . |
| 1324591 | 11/1993 | Canada . |

OTHER PUBLICATIONS

"Supersonic Abrasive Ice–Blasting," An Environmentally Friendly Method of Removing Paint Or Grease From Surfaces, Developed with NSF Funding, internet posting by Beth Gaston, Oct. 5, 1994, pp. 1–2.

"Ice Flake Air Jet Surface Cleaner", internet marketing information and correspondence, The Initiative Center of the Negev, Jun. 27, and 28, 1996, pp. 1–2.

*Primary Examiner*—Timothy V. Eley
*Attorney, Agent, or Firm*—Chernoff, Vilhauer, McClung & Stenzel, LLP

[57] ABSTRACT

An ice blasting cleaning system including an ice maker that creates ice particles, a hopper into which the ice particles enter, at least one mist nozzle that introduces a mist of water and air into the hopper, and a blasting gun that receives the ice particles and propels them toward the surface to be cleaned. In one embodiment, the ice maker includes a sizer that determines the size of the ice flakes produced. An ice blasting cleaning method includes the steps of creating ice particles that enter a hopper in which they are sprayed with mist and propelling the ice particles toward the surface to be cleaned.

8 Claims, 4 Drawing Sheets

ICE BLASTING CLEANING SYSTEM

BACKGROUND OF THE INVENTION

The present invention relates to a cleaning system that uses ice blasting and particularly to a system that uses coated ice particles as the cleaning agent.

Sand or grit blasting—propelling small granules of abrasives, such as sand or glass beads, towards surfaces such as walls, floors, and ceilings—has been widely used to clean surfaces that are dirty or have an unwanted coating (such as paint or graffiti). Grit blasting has several problems. For example, grit blasting is extremely abrasive which is damaging to the surface being cleaned. Also, the abrasives are expensive to obtain and become contaminated with the removed material after one use. Further, once the abrasives are contaminated they must be collected, a time consuming and often difficult proposition, and properly disposed since contaminated abrasives are usually not reusable. Since disposal costs are based on the weight of the material to be disposed, disposing of the abrasives along with the contaminants is extremely expensive.

Ice blasting, a process that uses ice or frozen material instead of traditional abrasives, solves some of the problems of grit blasting. For example, ice is generally not abrasive. Another example is that, if water is the frozen material, it is relatively inexpensive to obtain and is generally only needed in small quantities. Also, depending on where the ice blasting being done and the type of coating that is being removed, the contaminated ice particles often can be allowed to melt and evaporate and thus little or no collection would be necessary. Still further, depending on the removed material, disposal may be done after the water has evaporated which leaves only a small amount of removed material for disposal.

Ice blasting has several other advantages. For example, it can remove soft or hard coatings such as grease, tar, paint, and even radioactive contaminants without damaging the underlying substrate. It is also dustless.

Stratford et al. U.S. Pat. No. 5,203,794, Fong U.S. Pat. No. 4,038,786, Moore U.S. Pat. No. 4,617,064, and Fong et al. U.S. Pat. No. 4,389,820 disclose blasting apparatus that uses sublimable particles such as $CO_2$ as the cleaning agent. Although these devices are generally preferable to grit blasters, they still present several problems. For example, $CO_2$ generally comes in particles or in a dry ice block and is therefore expensive. Also, $CO_2$ is more difficult to obtain than water.

Visaisouk et al. U.S. Pat. No. 5,367,838, Ichinoseki et al. U.S. Pat. No. 4,655,847, Westergaard U.S. Pat. No. 4,703,590, and Kelsall U.S. Pat. No. 4,965,968 are directed to ice blast cleaning systems that can use ice formed from water as the cleaning agent. The ice blasting systems disclosed in these patents are troublesome, complicated, limited in use, and very expensive.

More specifically, the known ice blasting systems are troublesome to use because they have configurations that have fluidized ice flow that is very unstable and requires frequent adjustments. Further, these systems suffer from recurrent ice build-ups or ice plug-ups that cause expensive machine operation delays. These ice build-ups or plug-ups often occur when the temperature of the systems raise above freezing and then go below freezing again. Accordingly, these systems do not function properly in environments above freezing.

The designs of the systems are necessarily complicated because they must stay below freezing in order to function. Accordingly, all or part of each of these systems has to be cooled down to below freezing which uses significant energy and adds complicated and costly cooling and control devices.

SUMMARY OF THE PRESENT INVENTION

The ice blasting cleaning system of the present invention overcomes the aforementioned problems. Preferably, the system includes an ice maker that creates ice particles, a hopper into which the ice particles enter, at least one mist nozzle that introduces a mist of water and air into the hopper, and a blasting gun that receives the ice particles and propels them toward the surface to be cleaned.

In one embodiment, an ice maker is used that can create ice flakes of a predetermined size. The ice maker of this embodiment generally includes a water source, a cooled rotating drum, an ice breaker plate positioned at an angle to the rotating drum so that a scraping edge of the ice breaker plate is substantially adjacent to the rotating drum, and a sizer positioned at a sizing distance from the ice breaker plate and substantially adjacent an ice coating formed on the rotating drum. The sizer holds the ice coating on the rotating drum while the scraping edge of the ice breaker plate scrapes the ice coating off the rotating drum to create ice flakes. The sizing distance, which is preferably adjustable, substantially determines the flake size of the ice flakes.

The present invention also includes an ice blasting cleaning method for cleaning a surface using ice particles as the cleaning agent. The first step of the method is to create ice particles. The ice particles then enter a hopper in which they are sprayed with mist. Finally, the ice particles are propelled toward the surface to be cleaned. Except for the step of creating the ice particles, the method is generally accomplished in an above freezing environment.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
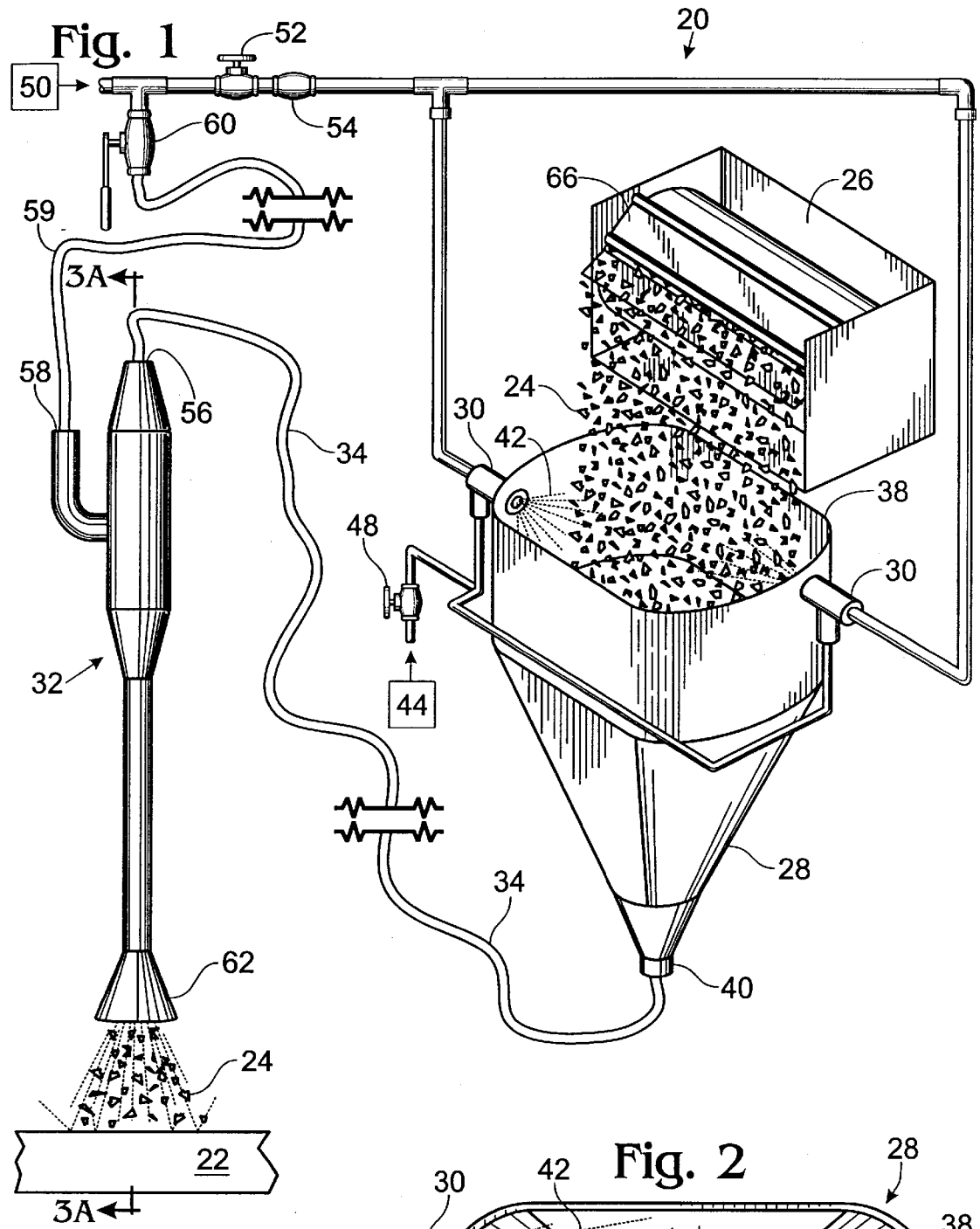
FIG. 1 is a perspective view of a preferred embodiment of the ice blasting cleaning system of the present invention.

Referring to FIG. 1, an ice blasting cleaning system 20 of the present invention is used for cleaning a surface 22 with ice particles 24. As shown, the system 20 generally includes an ice maker 26 that creates the ice particles 24, a hopper 28, at least one mist nozzle 30 directed into the hopper 28, and a blasting gun 32 connected to the hopper 28 by a hose 34.

Figure 4A:
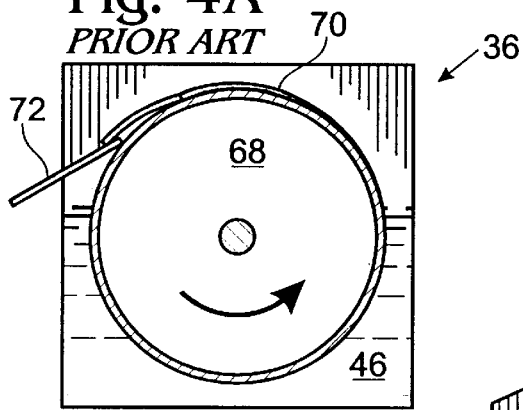
FIGS. 4A and 4B show a prior art embodiment of an ice maker.
Figure 4B:
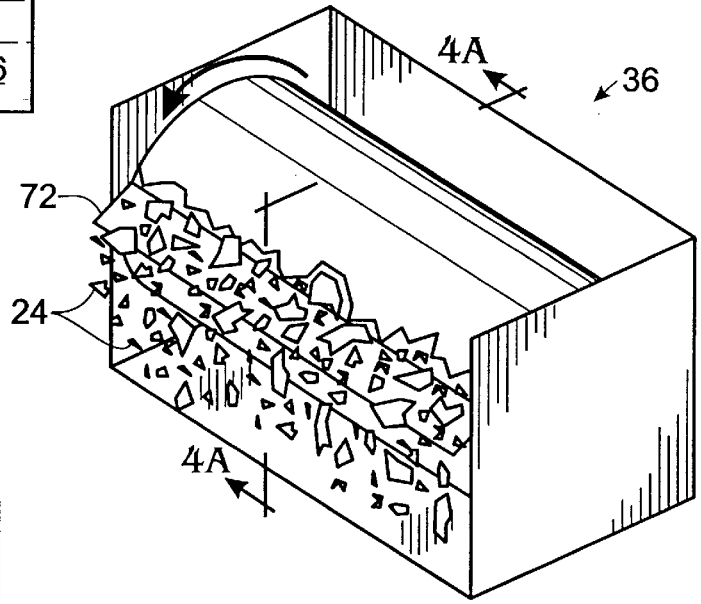
Figure 5A:
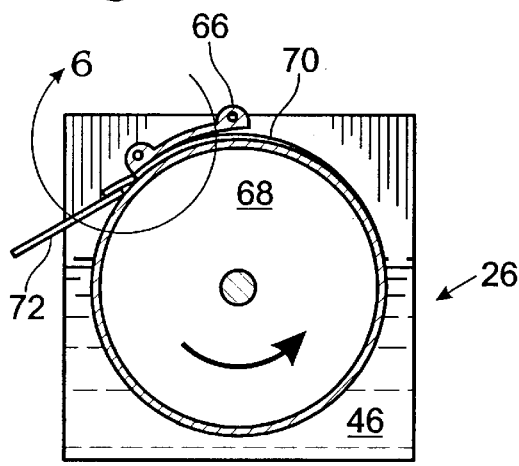
FIGS. 5A and 5B show an ice maker with a sizing shield.
Figure 5B:
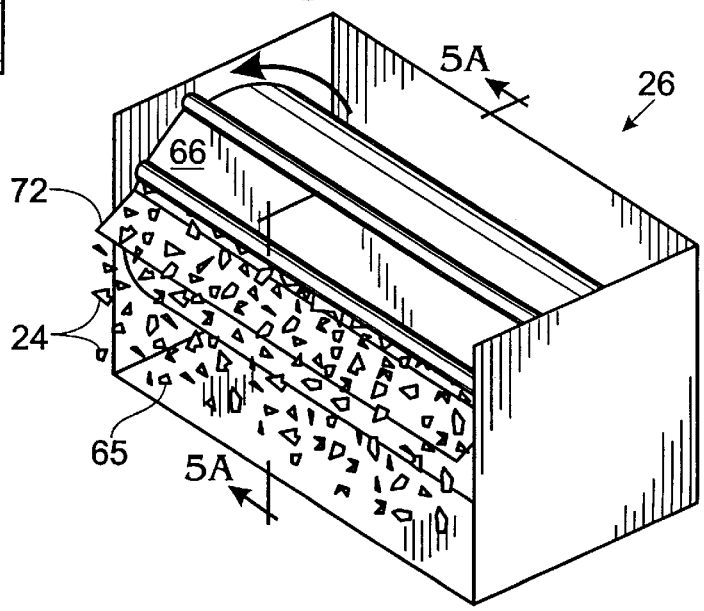

The ice maker 26, as will be discussed below in connection to FIGS. 5A and 5B, preferably creates relatively small ice particles 24. However, it should be noted that other ice makers, such as the ice maker 36 shown in FIGS. 4A and 4B, that produce a variety of sized ice particles or relatively large ice particles could be used.

The ice particles 24 are preferably pulled down by gravity downward into the hopper 28. The hopper 28 preferably has a first opening 38 through which the ice particles 24 enter the hopper 28. Preferably, the hopper 28 has a second opening 40 that is connected to the hose 34 and through which the ice particles 24 exit the hopper 28.

Figure 2:
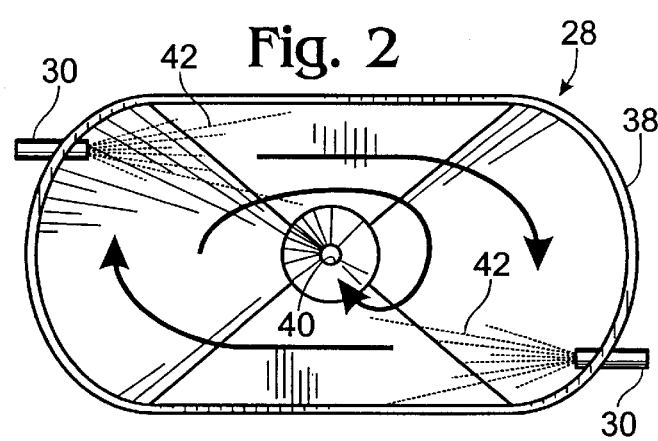
FIG. 2 is a top view of a hopper.

As shown in detail in FIG. 2, at least one mist nozzle 30, and preferably two mist nozzles 30, is directed into the hopper 28 for introducing a mist 42 of water and air into the hopper 28. The water that enters each mist nozzle 30 is provided by a water source 44 that may be cold water 46 from the ice maker 26. Alternatively, the water source 44 could be a separate source not affiliated with the ice maker. One or more flow control valves 48 can be used to control the amount of water provided to each mist nozzle 30. Air is provided to each mist nozzle 30 from an air source 50 and is preferably compressed air. An air flow control valve 52 may be used to control the flow of air to each mist nozzle 30. Other controls (shown generally as 54) may include a low pressure air circuit or a pressure reducing valve that may be used in conjunction with or alternatively to the flow control valve 52 to control air pressure.

It should be noted that the first opening 38 of the hopper 28 preferably has a first diameter and the second opening 40 preferably has a second diameter. Preferably the second diameter is smaller than the first diameter and the diameter of the hopper 28 decreases from the first diameter to the second diameter. By decreasing the diameter of the hopper 28 the ice particles 24 are generally directed downward toward the second opening 40. Generally, the shape of the hopper 28 could be described as "conical."

Also, as mentioned above, preferably there are. two mist nozzles 30 that are positioned at opposite ends of the hopper 28 so that the mist 42 swirls (FIG. 2) within the hopper 28. The air in the mist 42 turns the water into mist and a flow of air in which the ice particles 24 to swirl and collide. The water in the mist 42 coats the surface of the ice particles 24 during this swirling process.

The conical shape of the hopper 28 and the swirling mist 42 together serve to increase the velocity of the ice particles 24 and to cause the ice particles 24 to swirl within the hopper 28. The increased velocity is beneficial in that it adds to the speed in which the ice particles 24 travel through hose 34. The swirling motion is beneficial because it causes the ice particles 24 to separate from each other so that they do not enter the hose 34 in a bunch. Also, as mentioned above, the swirling motion causes the ice particles 24 to collide. As will be discussed below, ice particles 24 that collide break into smaller ice particles and "snow" which helps to keep the other particles cool. The swirling also causes the ice particles 24 to travel in a spiral path that helps to prevent them from adhering to the walls of the hopper 28.

From the hopper 28, the ice particles 24, that are now coated with water, are preferably pneumatically conveyed to the blasting gun 32. Within the blasting gun 32 the mixture is further accelerated and propelled toward the surface 22 to be cleaned.

Figure 3A:
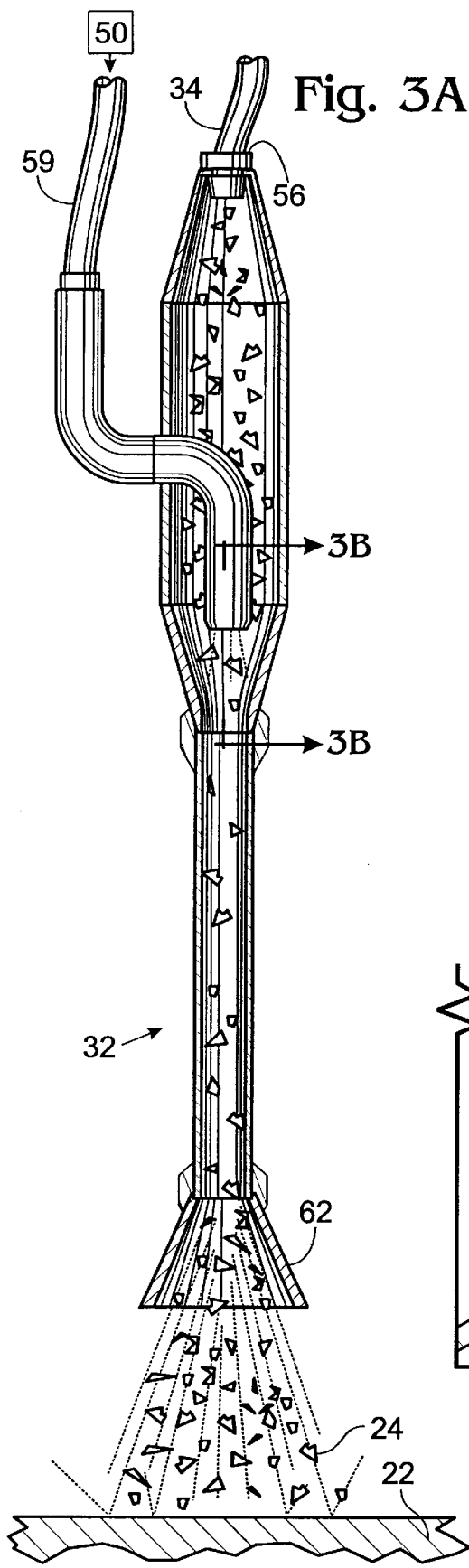
FIG. 3A is a cross-sectional side view of a blasting gun.
Figure 3B:
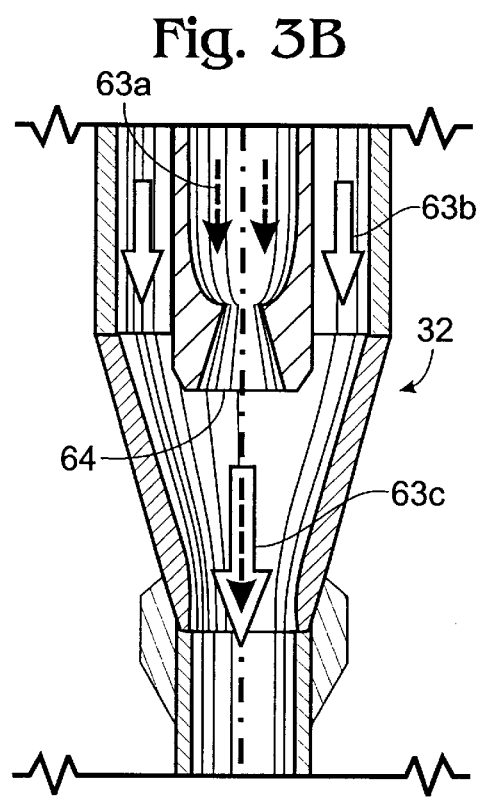
FIG. 3B is an enlargement of FIG. 3A taken along lines 3B—3B.

The preferred embodiment of the blasting gun 32, shown generally in FIG. 1 and in detail in FIGS. 3A and 3B, receives the ice particles 24 and propels the ice particles 24 toward the surface 22 to clean it. The blasting gun 32 is preferably connected to the second opening 40 of the hopper 28 by the hose 34 at an ice particle opening 56. The blasting gun is preferably connected to an air source 50 at an air opening 58 by an air hose 59. Air flow may be controlled by a blast air control valve 60. The combined ice particles 24 and air exits through the gun exit nozzle 62.

FIG. 3B shows that the air flow 63a (shown as dashed arrows) is introduced centrally through the central air flow nozzle 64 into the blasting gun 32. The ice particle flow 63b (shown as open arrows) flows essentially around the air flow 63a. The air flow 63a and ice particle flow 63b combine and the combination flow 63c (shown as dashed arrows) flows through the gun exit nozzle 62. This configuration, and the added air flow 63a, acts as a venturi that pulls forward the ice particles 24 from behind the entrance of the air flow 63a. As mentioned above, the combined ice particles 24 and air exit through the gun exit nozzle 62.

Because the ice particles 24 that emanate from the gun exit nozzle 62 have been melting as they travel through the system 20 and have collided and broken along the way, they may be of a small, medium, or large size. Each size serves a specific purpose as it emanates from the blasting gun 32 and impacts the surface 22. The smallest particles sublimate as they hit the surface 22 to help fracture the unwanted surface coatings. The medium sized particles melt into water as they hit the surface 22 and therefore assist in washing away the coating. The largest particles bounce off the surface 22 as they hit.

It should be noted that air source 50 is preferably compressed air that supplies air for both the mist nozzle 30 and the blasting gun 32. High, medium, and low pressure compressed air may be used and it may be any temperature. One of the features of this invention is that the compressed air may be at ambient temperature, so no cooling or drying equipment is required. The flow of the air pressure may be controlled through flow control devices 52, 54, and 60 as discussed above.

The system 20, as described above, includes an ice maker 26 that provides ice particles 24 that fall or are pulled into the hopper 28. There are many types of ice makers which could be used for this purpose. As shown, however, the system 20 includes a horizontal drum ice maker 26 (FIGS. 5A and 5B) that creates a specific type of ice particle 24. Specifically, the ice maker 26 creates ice flakes 65 of relatively even and small size. An alternative ice maker 36, shown in FIGS. 4A and 4B, is also a horizontal drum ice maker, but it produces uneven or relatively large ice flakes. The alternative ice maker 36 is a fairly standard horizontal drum ice maker that may be purchased from Weber Eistechnic GmbH in Ohlsbach, Germany.

Figure 6:
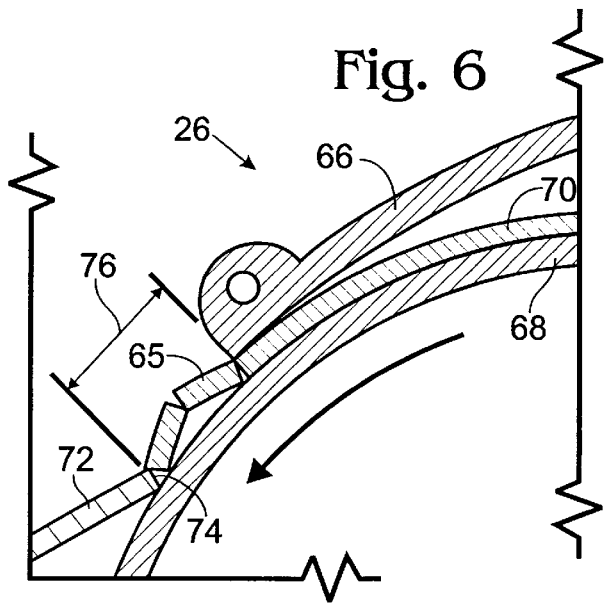
FIG. 6 is a cross-sectional enlargement of the sizing shield.

The preferred ice maker 26 includes a sizer, shown as a sizing shield 66, that has a significant effect on the resulting ice flakes 65. As shown in FIGS. 5A, 5B, and 6, the preferred horizontal drum ice maker 26 includes a water source 46 for supplying water that is applied to a rotating drum 68. The water source 46 may be a reservoir (as shown) through which the rotating drum 68 rotates or it may be a sprayer (not shown) that sprays a coat of water on the rotating drum 68. The rotating drum 68 is preferably cooled or refrigerated so that the coat of water freezes to form an ice coating 70 on the rotating drum 68. The ice maker 26 also includes an ice breaker plate 72 with a scraping edge 74. The ice breaker plate 72 is preferably positioned at an angle to the rotating drum 68 so that the scraping edge 74 is substantially adjacent to the rotating drum 68. It should be noted that the scraping edge 74 should be far enough from the rotating drum 68 that the drum can still rotate but close enough to allow the scraping edge 74 to scrape the ice coating 70 from the rotating drum 68 as it rotates.

A sizer such as the sizing shield 66 is preferably positioned substantially adjacent the ice coating 70 on the rotating drum 68. The sizing shield 66 should precede the ice breaker plate 72 by a sizing distance 76. To create properly sized ice flakes 65, the sizing shield 66 holds the ice coating 70 on the rotating drum 68 while the scraping edge 74 of the ice breaker plate 72 scrapes the ice coating 70 off the rotating drum 68. The size of the ice flakes 65 is determined substantially by the sizing distance 76.

In the preferred embodiment, the sizing shield 66 would be adjustable to accommodate different thicknesses of the ice coating 70 and different sizing distances 76. The thickness of the ice coating 70 would be controlled by such factors as the rotation speed of the drum 68, the temperature of the drum 68, and the amount of water from the water source 46. The larger the sizing distance 76, the larger the ice flakes 65.

It should be noted that the sizer may be a roller, conveyer tape, or any other apparatus that limits the ice coating 70 from lifting off the drum 68. Further, the sizer may be made from any suitable material including plastic.

Figure 7:
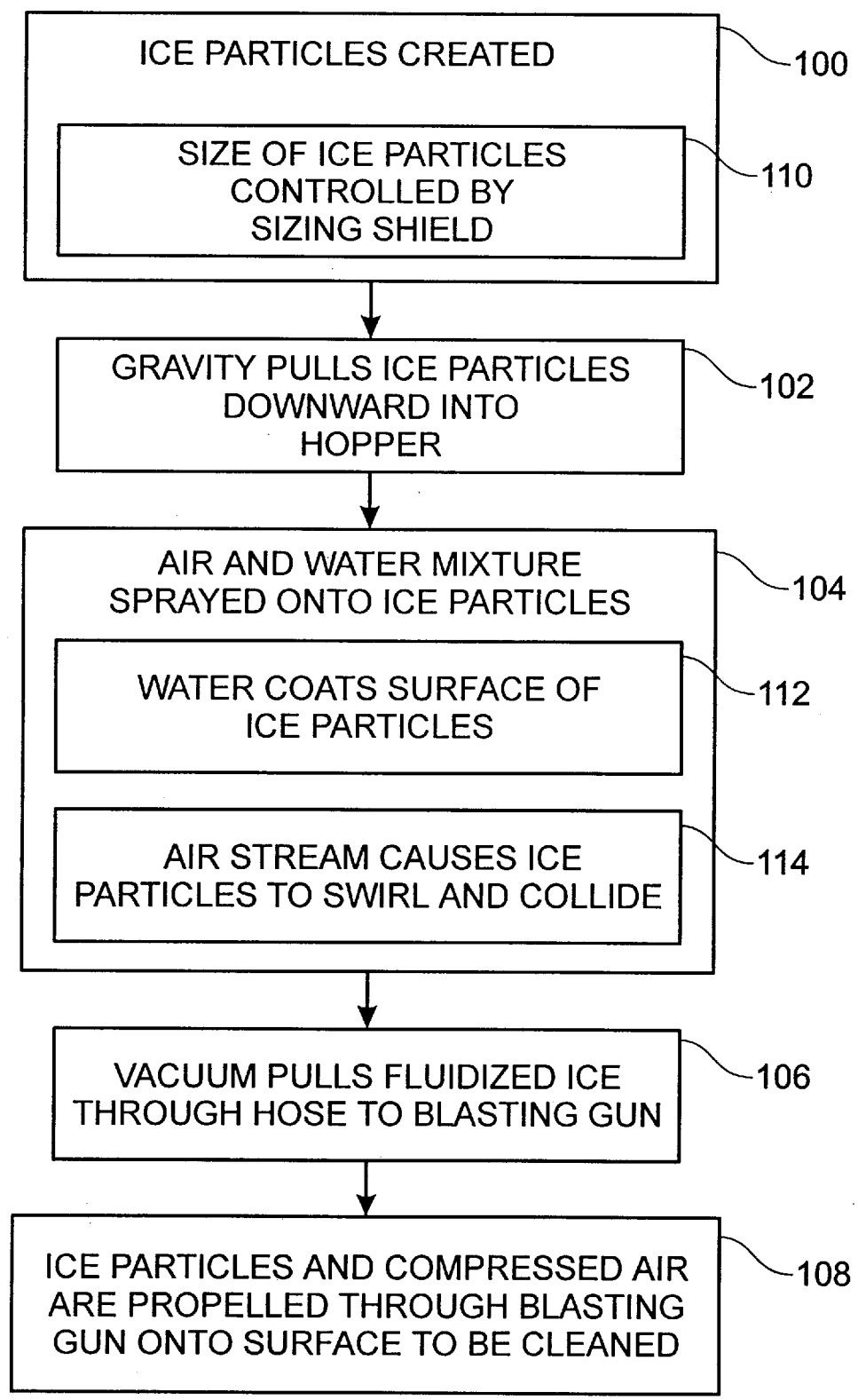
FIG. 7 is a flow chart depicting the ice blasting method of the present invention.

The present invention, as shown in FIG. 7, also includes an ice blasting cleaning method for cleaning a surface 22 with ice particles 24. The first step of the cleaning method is to create ice particles 100 which enter a hopper 102. A mist comprising of air and water is sprayed in the hopper 28 so that the air and water mixture is sprayed onto the ice particles 104. The ice particles then flow, pulled by a vacuum or venturi, to the blasting gun 106. The ice particles and compressed air are then propelled onto a surface to be cleaned 108.

The cleaning method may also include the step of sizing the ice particles using a sizer 110 such as a sizing shield 66. The step of spraying mist 104 can be divided into two smaller steps: spraying a coating of water onto the surface of the ice particles 112 and spraying a stream of air that causes the particles to swirl and collide 114. Finally, the step of propelling the ice particles 108 may include the intermediate step of adding air to the ice particles.

The above apparatus and method, unlike the prior art systems that only work in a cold environment (below freezing and generally in the range of 0° F. to 15° F.), works well in warmer environments. Although ice particles 24 are created at below freezing (or simply supplied), the rest of the system 20 functions in a generally warm environment that is above freezing. There are several advantages to this feature including that the system 20 does not require additional cooling and does not experience the ice build-ups and plug-ups associated with previous systems.

Previous systems have been designed to work at below freezing temperatures because it was thought that to transport ice particles over any significant distance the particles would have to be kept below freezing. The present system 20, however, takes advantage of the fact that ice melts very slowly when it is at temperatures just above freezing. However, if previous systems were simply stripped of their cooling apparatus, they would not function because the ice particles would melt before they could be effective in ice blasting. The system 20 of the present invention, however, has several temperature controlling features that keep the system 20 in a temperature range of just above freezing to up to 50° F. In this temperature range the ice particles can be transported while they are slowly melting, but still effective for ice blasting cleaning.

The first temperature controlling feature is that the ice particles 24 that collide break into smaller ice particles and "snow" which helps to keep the other particles cool. The collisions are generally caused by the swirling of the ice particles 24 within the hopper 28, as described above.

The second temperature controlling feature is that the ice particles 24 are coated with water in the hopper 28. Generally, if the ice particles are uncoated, ice particles from an ice maker would start to melt as soon as the temperature went above freezing. This would cause the particles to decrease in size as a surface layer of water was formed thereon. However, in the present invention, the ice particles 24 are immediately coated with a thin layer of water. If the water is cool, which it would be if it came from the reservoir 46 of the ice maker 26, the ice particles 24 would not have to melt to form the surface coating. The surface coating would then serve as an insulator to protect the ice particle from melting.

The third temperature controlling feature is that the ice particles 24 travel very rapidly through the system 20. The centrifugal action of the ice particles 24 in the hopper 28, along with other features described above, increase the speed of the ice particles 24 as they travel through the system 20.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A horizontal drum ice maker for creating ice flakes each of which having a flake size, said ice maker comprising:
   (a) a water source for supplying water;
   (b) a cooled rotating drum coatable by said water, said rotating drum suitable to freeze an ice coating thereon, said ice coating having an ice thickness distance;
   (c) an ice breaker plate with a scraping edge, said ice breaker plate positioned at an angle to said rotating drum, said scraping edge substantially adjacent to said rotating drum;
   (d) a sizer positioned substantially said ice thickness distance from said rotating drum, said sizer positioned at a sizing distance from said ice breaker plate; and
   (e) said sizer holding said ice coating on said rotating drum while said ice breaker plate scrapes said ice coating off said rotating drum to create ice flakes, said sizing distance substantially determining the flake size of said ice flakes.

2. The ice maker of claim 1 wherein said sizer is adjustably positionable in relation to said ice breaker plate.

3. The ice maker of claim 1 wherein said water source is a reservoir through which said rotating drum rotates.

4. The ice maker of claim 1 wherein said water source is a sprayer that sprays a coat of water on said rotating drum.

5. A horizontal drum ice maker for creating ice flakes each of which having a flake size, said ice maker comprising:
   (a) a fluid source for supplying fluid;
   (b) a cooled rotating drum coatable by said fluid, said rotating drum suitable to freeze an ice coating thereon, said ice coating having an ice thickness distance;
   (c) an ice breaker plate with a scraping edge, said ice breaker plate positioned at an angle to said rotating drum, said scraping edge substantially adjacent to said rotating drum, said ice breaker plate suitable for scraping said ice coating off said rotating drum;

(d) a sizer positioned substantially said ice thickness distance from said rotating drum, said sizer positioned at a sizing distance from said ice breaker plate, said sizer holding said ice coating on said rotating drum; and (e) said sizing distance determining a maximum flake size of said ice flakes.

6. The ice maker of claim 5 wherein said sizer is adjustably positionable in relation to said ice breaker plate.

7. A horizontal drum ice maker for creating ice flakes each of which having a flake size, said ice maker comprising:

(a) a fluid source for supplying fluid;

(b) a cooled rotating drum coatable by said fluid, said rotating drum suitable to freeze an ice coating thereon, said ice coating having an ice thickness distance;

(c) an ice breaker plate with a scraping edge, said ice breaker plate positioned at an angle to said rotating drum, said scraping edge substantially adjacent to said rotating drum;

(d) a sizer positioned substantially said ice thickness distance from said rotating drum, said sizer positioned at a sizing distance from said ice breaker plate; and (e) said sizer and said ice breaking plate together creating ice flakes of a flake size substantially determined by said sizing distance.

8. The ice maker of claim 7 wherein said sizer is adjustably positionable in relation to said ice breaker plate.

* * * * *